United States Patent [19]
Quate

[11] 3,803,395
[45] Apr. 9, 1974

[54] METHOD OF AN APPARATUS FOR PROCESSING OF SIGNALS TO TRANSFORM INFORMATION BETWEEN THE TIME DOMAIN AND FREQUENCY DOMAIN

[75] Inventor: Calvin F. Quate, Los Altos Hills, Calif.

[73] Assignee: The Board of Trustees of Leland Stanford Junior University, Stanford, Calif.

[22] Filed: Sept. 7, 1972

[21] Appl. No.: 286,929

[52] U.S. Cl. .................. 235/193, 235/197, 310/8.1
[51] Int. Cl. ......................... G06g 7/19, H01v 7/00
[58] Field of Search .......... 235/181, 183, 193, 194, 235/197; 444/1; 310/8.1

[56] References Cited
UNITED STATES PATENTS
3,675,052 7/1972 Lindsay et al. ...................... 310/8.1
3,648,081 3/1972 Lean et al. .......................... 310/8.1

OTHER PUBLICATIONS
Fisk: New Acoustoelectronic Compounds Replace Conventional Tuned Circuits, Popular Electronics, March 1971, pp. 27–33.

Primary Examiner—Felix D. Gruber
Attorney, Agent, or Firm—Paul B. Fihe

[57] ABSTRACT

A method of and apparatus for signal processing to transform information between the time domain and frequency domain (Fourier transform) wherein a time-varying electromagnetic signal to be analyzed and a series of radio frequency pulses are applied to a piezoelectric medium so as to interact at predetermined positions, and generate sampling pulses which are subsequently combined in the medium in a fashion to provide the discrete Fourier transform of the time-varying signal.

5 Claims, 2 Drawing Figures

METHOD OF AN APPARATUS FOR PROCESSING OF SIGNALS TO TRANSFORM INFORMATION BETWEEN THE TIME DOMAIN AND FREQUENCY DOMAIN

FIELD OF THE INVENTION

The present invention relates generally to the processing of electromagnetic signals and more particularly to a method of and apparatus for processing electromagnetic signals in a fashion to provide transformation of information between a time domain and a frequency domain such as the Fourier, Hadamard, or analogous transforms.

BACKGROUND OF THE INVENTION

The Fourier transform has for many years been used for identifying the frequency components making up a continuous waveform of an electromagnetic signal or, in other words, to determine the frequency spectrum of a signal which is presented as a running variation with time. Mathematically, the continuous Fourier transform $F(\omega)$, or spectrum, of a time-varying electromagnetic signal, $f(t)$ is given by $$F(\omega) = \int_{-\infty}^{\infty} f(t) e^{-j\omega t} dt$$

In practice, an excellent approximation of the continuous Fourier transform has been provided by the so-called discrete Fourier transform (DFT) wherein the time-varying signal to be analyzed is sampled at discrete time intervals. A derivation of the discrete Fourier transform from the continuous Fourier transform can be found for example in the volume by Blackman and Tukey entitled, "The Measurement of Power Spectra", New York; Dover, 1958, and can be represented by the following summation $$DFT = \sum_{n=0}^{N-1} A(n) W^{mn}$$

where N is the total number of samples in the time domain,
$n$ represents the numbering of the samples in the time domain,
$m$ represents the numbering of the discrete samples in the frequency domain
W is the complex exponential, $\exp(-j2\pi/N)$, and
$A(n)$ are the time domain sample values. As explained in an article entitled, "A Guided Tour of the Fast Fourier Transform" by G. D. Bergland in IEEE Spectrum of July, 1969, pgs 41 ff, the discrete Fourier transform lends itself to digital processing techniques which are discussed theoretically in such article and whcih have been implemented in terms of hardward in the entire issue of IEEE Transactions on Audio and Electroacoustics of June, 1969, which clearly indicates the significance as well as the problems encountered in this area of signal processing. More particularly, a review of such articles indicates both the high cost and relative slow speed of such Fourier transform processing. Other analogous transforms between the frequency and time domains are also known, such as the Hadamard transform discussed in detail in the article by Pratt, Kane and Andrews entitled "Hadamard Transform Image Coding", IEEE Proceedings, Vol. 57, No. 1, p. 58 ff. (January 1969), and the same processing problems have been encountered.

SUMMARY OF THE PRESENT INVENTION

Accordingly, it is the general objective of the present invention to provide a method of and apparatus for utilizing acoustic waves to process signals whereby information can be transformed between the time domain and the frequency domain in a relatively simple fashion with a minimum of both time and cost. Generally, the method is carried out through the interaction of acoustic waves in a piezoelectric medium. The signal wave to be analyzed which takes the form of a time-varying electromagnetic signal is introduced by a suitable directional transducer of known characteristics to the piezoelectric medium so as to traverse the medium as a continuous acoustic wave which can be of any type but is preferably an acoustic surface wave. In the piezoelectric medium, the acoustic signal wave is sampled at discrete intervals by the introduction of a series of identical short acoustic pulses by a suitable directional transducer so as to travel along the same predetermined path in a fashion such that translation of the pulses with respect to the acoustic signal wave occurs. A standard pulse generator is initially utilized to form the series of identical electromagnetic pulses, preferably at regular intervals and of predetermined phase at a frequency which is not critical but preferably is at a radio frequency of approximately 100 MHz. As mentioned, the individual pulses are identical, each having the same amplitude and a pulse duration of preferably 50 nanoseconds so that when applied to the piezoelectric medium they will occupy a distance along the predetermined propagation path of approximately 100 microns. The number of radio frequency sampling pulses in a given period of time is selected so that a plurality of the sampling pulses will occur during a single cycle of the signal wave which is to be analyzed, and a corresponding number of output transducers are disposed at regularly spaced positions along the common predetermined propagation path of the signal wave and the sampling acoustic pulses enabling the extraction of electromagnetic energy at each transducer when an individual pulse and one portion of the acoustic signal wave overlap or obtain phase coherence under a particular transducer, thus to provide nonlinear parametric interaction in a known fashion so as to generate within the piezoelectric medium as an electric polarization which is extracted as electrogmagnetic energy by the output transducer. The output at a given transducer is proportional to the product of the instantaneous value of the signal wave, and the sampling pulse, but in view of the fact that all sampling pulses are identical, it will be clear that the output at each individual transducer will be directly proportional to the amplitude of the signal wave at that position.

The electromagnetic energy extracted at each output transducer position resultant from the parametric interaction of the signal wave and one of the sampling pulses is in turn used to excite a unique one of a first predetermined set of electro-acoustic transducers, thus to generate at unique positions in the piezoelectric medium a group of acoustic pulses along predetermined paths.

Certain of the first exciting transducers are along common paths at predetermined positions so that preselected pulses generated from certain sampled sections of the signal wave will traverse a common path which is aligned with one of a set of first receiving transducers, a predetermined one of which accordingly is excited by several acoustic pulses thus to provide the summation thereof.

This process is repeated in that the summed acoustic pulses extracted by the first receiving transducer are then used to excite one of a second set of electroacoustic transducers appropriately positioned on the same piezoelectric medium to in turn generate a second group of acoustic signals along predetermined paths for additional summation at second receiving transducers, such repetitive summation or combining process continuing to provide the series summation generally expressed by the previously mentioned mathematical series summation:

$$DFT = \sum_{n=0}^{N-1} A(n) W^{mn}$$

As will be explained in detail hereinafter, the W term in the mathematical summation electronically is represented by a phase shift which can be achieved through appropriate placement of the acoustic wave transducers on the piezoelectric medium.

In summary then, the method of signal processing utilizing acoustic waves to transform the information between the time domain and the frequency domain comprises the steps of first applying a time-varying electromagnetic signal to a piezoelectric medium so as to generate an acoustic wave along a predetermined path, and simultaneously generating a series of short sampling pulses at predetermined and preferably regular time intervals, and applying those sampling pulses to the piezoelectric medium to traverse the same path in a fashion such that translation of the sampling pulses occurs relative to the time-varying signal and parametric coupling of the individual pulses and the signal wave occurs at predetermined spaced positions whereat the coupled energy may be extracted by suitable transducers to generate acoustic pulses in a fashion so that repeated summations of acoustic energy corresponding to the mathematical formulation of the discrete Fourier transform (DFT) or other transforms is attained.

BRIEF DESCRIPTION OF THE DRAWINGS

The stated objective of the invention and the manner in which it is achieved as summarized hereinabove will be more readily understood by reference to the following detailed description of a specific embodiment of the invention as shown in the accompanying drawings.

DETAILED DESCRIPTION OF THE EXEMPLARY EMBODIMENT OF THE INVENTION

Figure 2:
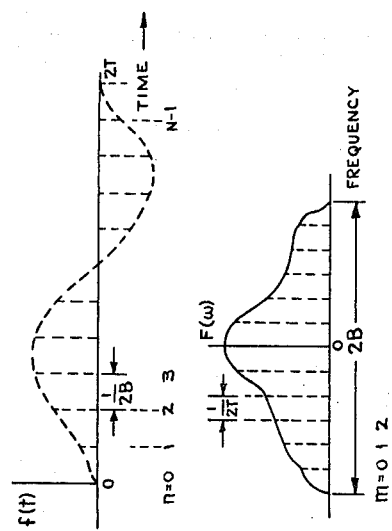
FIG. 2 is a graphical representation of a signal wave in its time and frequency domains.

If one wishes to perform a discrete Fourier transform in accordance with the mentioned summation, $$DFT = \sum_{n=0}^{N-1} A(n) W^{mn},$$

a signal wave $f(t)$ as illustrated in the upper portion of FIG. 2 extending for a cyclical period of $2T$ in the time domain is sampled at intervals equal to ½ B with n representing the discrete numbering of the samples in such time domain, the total samples equalling $N = (2T)/(½ B) = 4TB$.

In the frequency domain, shown in the bottom portion of FIG. 2 the total frequency spectrum is indicated as extending over a bandwidth of $2B$ and the frequency samples are in turn spaced by an interval of ½ T, the discrete numbering of the samples in the frequency domain being indicated by $m$.

The precise derivation of this series summation to compute DFT is explained in detail in the mentioned article, "A Guided Tour of the Fast Fourier Transform" by G. D. Bergland in the IEEE Spectrum of July, 1969, pgs 41 ff, to which reference is made for mathematical details. If one desires to perform the discrete Fourier transform with a sampling of the signal wave at eight regular intervals ($N = 8$), the eight samples in the time domain can be designated by the symbols $A(0)$, $A(1)$, $A(2)$, $A(3)$, $A(4)$, $A(5)$, $A(6)$ and $A(7)$, and following the Bergland calculation of the discrete Fourier transform, the initial eight samples are used to compute three successive summations, as listed below, to enable ultimate calculation of the discrete frequency components:

$A_1(0) = A(0) + A(4)W^0$
$A_1(1) = A(1) + A(5)W^0$
$A_1(2) = A(2) + A(6)W^0$
$A_1(3) = A(3) + A(7)W^0$
$A_1(4) = A(0) + A(4)W^4$
$A_1(5) = A(1) + A(5)W^4$
$A_1(6) = A(2) + A(6)W^4$
$A_1(7) = A(3) + A(7)W^4$
$A_2(0) = A_1(0) + A_1(2)W^0$
$A_2(1) = A_1(1) + A_1(3)W^0$
$A_2(2) = A_1(0) + A_1(2)W^4$
$A_2(3) = A_1(1) + A_1(3)W^4$
$A_2(4) = A_1(4) + A_1(6)W^2$
$A_2(5) = A_1(5) + A_1(7)W^2$
$A_2(6) = A_1(4) + A_1(6)W^6$
$A_2(7) = A_1(5) + A_1(7)W^6$
$A_3(0) = A_2(0) + A_2(1)W^0$
$A_3(1) = A_2(0) + A_2(1)W^4$
$A_3(2) = A_2(2) + A_2(3)W^2$
$A_3(3) = A_2(2) + A_2(3)W^6$
$A_3(4) = A_2(4) + A_2(5)W^1$
$A_3(5) = A_2(4) + A_2(5)W^5$
$A_3(6) = A_2(6) + A_2(7)W^3$
$A_3(7) = A_2(6) + A_2(7)W^7$

It will be seen that the individual mathematical operations are quite simple constituting a simple additive process coupled with multiplication by a complex exponential. The addition process can be achieved quite simply in acoustic wave devices operating in a known fashion by the summation of two acoustic signals in an individual output transducer and, in turn, the acoustic analog of the multiplication by the complex exponential can readily be achieved by a simple phase shift. With such general acoustic wave concepts in mind, the transformation of eight samples of a signal wave from the time domain into the frequency domain can readily be achieved by the apparatus diagrammatically indicated in FIG. 1.

Figure 1:
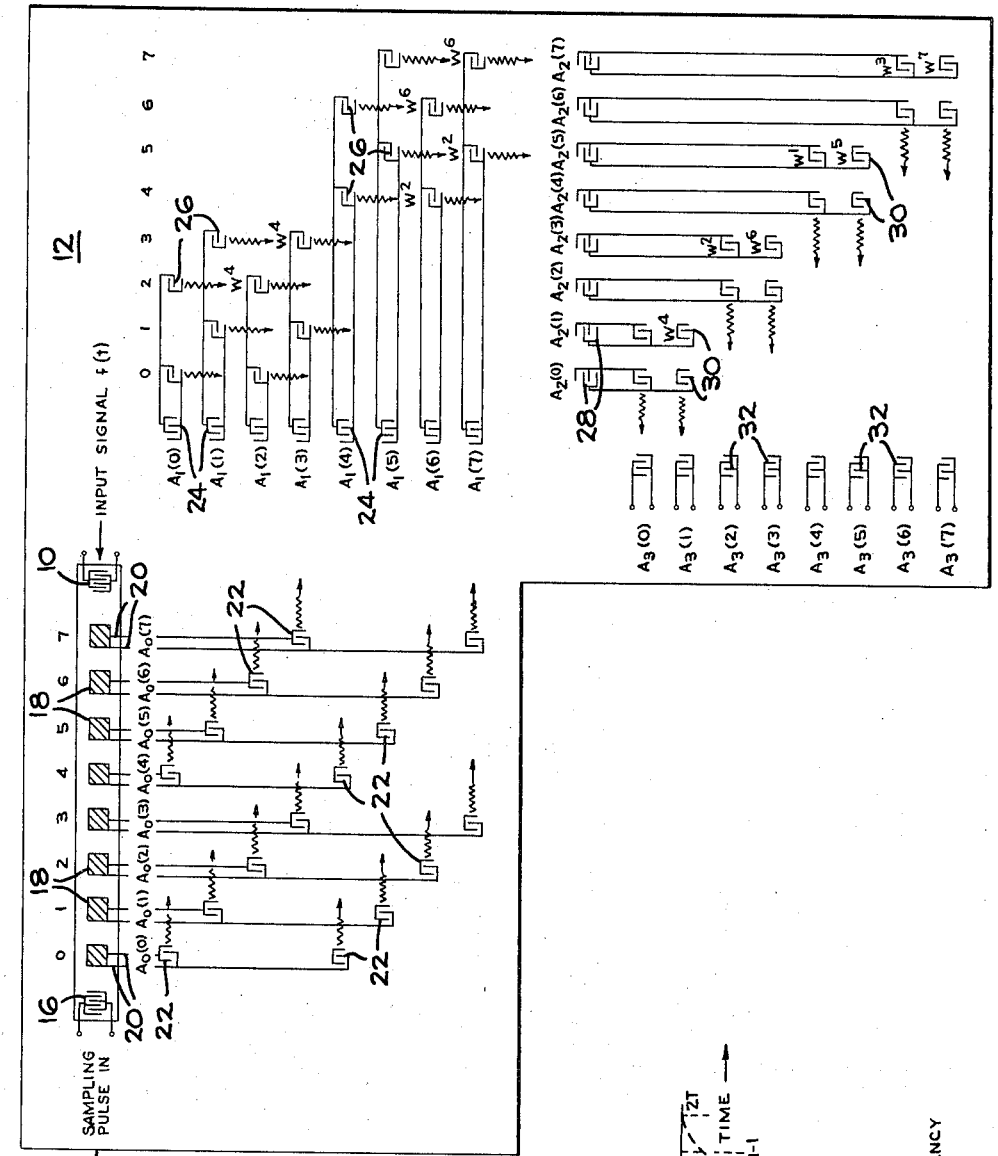
FIG. 1 is a diagrammatic representation of a specific acoustic wave device arranged to perform a fast discrete Fourier transform at eight sample positions of one cycle of the signal wave.

More particularly, the signal wave f(*t*) is delivered through an input directional electro-acoustic transducer 10 which preferably takes the form of an interdigital structure such as described in the article "Convolution and Time Inversion Using Parametric Interactions of Acoustic Surface Waves" by Luukkala and Kino in Applied Physics Letters, volume 18, Number 9, May 1, 1971, so as to generate in a piezoelectric medium 12 composed of lithium niobate, bismuth germanium oxide or other piezoelectric material, a continuous acoustic surface wave which travels along a predetermined path from right to left as shown in FIG. 1.

A series of identical radio frequency sampling pulses are generated by suitable pulse generator 14 diagrammatically indicated in FIG. 1 preferably having a frequency of 100 MHz, a pulse duration of 50 nanoseconds, and with time intervals therebetween such that eight of the sampling pulses occupy the same time period as a single cycle of the signal wave. The series of pulses are delivered to a directional electro-acoustic transducer 16 also of the same interdigital type to the left end of the piezoelectric medium 12 so as to generate a series of acoustic pulses which travel from left to right along the same propagation path as the signal wave but in the opposite direction so that translation of the two acoustic waves occurs.

The two signals, that is, the series of sampling pulses and the signal wave, are caused to parametrically interact in a fashion briefly mentioned in the referred to Luukkala-Kino article and explained in detail in Chapter 5 of W. H. Louisell, Coupled Mode and Parametric Electronics, 1960. Briefly, if two signals of frequency $\omega_1$ and $\omega_2$, and propagation constants $k_1$ and $k_2$ respectively are passed in opposite directions through a piezoelectric medium, the nonlinearity present in the medium gives rise to an acoustic strain component with a frequency $\omega_3 = \omega_1 + \omega_2$, and a propagation constant $k_3 = k_1 - k_2$. It may be mentioned that it is now well known that if the two waves are surface acoustic waves, the power densities are high so that the acoustic strain is relatively large whereby the nonlinear parametric interaction can take place at relatively low power densities.

While not essential, the signals can be controlled to provide a combined propagation constant $k_3 = 0$ in which case, as explained in the mentioned Luukkala-Kino article, electromagnetic energy proportional to the product of the strain amplitudes of an individual pulse and the overlapping portion of the signal wave can be extracted by a sampling transducer 18 in the form of a gold electrode pair or by a semiconductor arrangement as described in the Lee-Gunshor article, "Enhancement of Nonlinearity in Surface Acoustic Wave Propagation from Coupling to Charge Carriers", Applied Physics Letters, volume 20, Number 8, April 15, 1972.

In the present embodiment, a plurality of such sampling transducers 18 are positioned at regularly spaced intervals along the common propagation path of the sampling pulses and the signal wave and since the sampling number, $N = 8$, the number of such sampling transducers is, in turn, 8. The size of each transducer 18 is approximately 100 microns in the direction of travel which roughly corresponds to the distance occupied by an individual sampling pulse along the piezoelectric medium 12, and the spacing between the transducers is equivalent to the spacing between the sampling pulses along the propagation path. Accordingly, at each sampling transducer 18 the output electromagnetic energy is proportional to the level of the sampled signal wave, it being remembered that the sampling pulses are identical and thus give rise to equivalent strain amplitudes in a piezoelectric medium. Thus with reference to the previous mathematical representations, and as specifically indicated in the drawing, the outputs of the eight sampling transducers 18 constitute the eight samples of the signal wave designated as A(0), A(1), A(2), A(3), A(4), A(5), A(6) and A(7).

The electromagnetic outputs of the eight sampling transducers are delivered by suitable electric connections 20 to spaced sets of electroacoustic transducers 22, preferably in the form of interdigital transducers, which generate acoustic propagating waves along a group of parallel paths, as diagrammatically indicated, selected pairs of the transducers being longitudinally aligned along common parallel acoustic paths which extends to corresponding sum transducers 24 which convert the sum of the acoustic wave pairs along each common propagation path to an electromagnetic signal so as to correspond to the first summation section of the Table producing the $A_1$ series of signals. For example, the sampled pulses A(0) and A(4) excite two transducers 22 which are in alignment, and the summation of these two generated acoustic signals is delivered to the uppermost sum transducer 24 to provide the summed signal $A_1(0)$. The respective transducers providing for this first summation series are appropriately spaced on the piezoelectric medium to provide signal overlay at the sum transducer and a phase change which is the acoustic analog of the multiplication by the complex exponential, W, it being well-known that a change in acoustic path length produces a phase change of the propagated signal.

The $A_1$ first sum transducers 24 in turn excite pairs of transducers 26 corresponding to the additive elements in the second Table section so as to generate acoustic pulses traveling in summed parallelism at right angles to the first summation of signals and are in turn extracted as electromagnetic signals by aligned second sum transducers 28 in the $A_2$ series, and repetitively, these $A_2$ transducers excite additional interdigital transducers 30 that provide the final signal summation corresponding to the third additive series providing the $A_3$ series output at the third sum transducers 32. The sampled frequency components, $X_n$, are directly related to the $A_3$ series in the following fashion:

$X(0) = A_3(0)$
$X(1) = A_3(4)$
$X(2) = A_3(2)$
$X(3) = A_3(6)$
$X(4) = A_3(1)$
$X(5) = A_3(5)$
$X(6) = A_3(3)$
$X(7) = A_3(7)$

Many variations from the described exemplary apparatus can be envisioned. For example, there is no particular limit on the number of samples since acoustic devices with rather long delay paths (acoustic velocity $3 \times 10^5$ cm./sec.,) are known and power levels of acoustic surface waves are minimal. Furthermore, even though several acoustic summations are required, by the arrangement of non-intersecting propagation paths, the complete transformation can be carried out on a single piezoelectric unit or, as an alternative on several piezoelectric units which can be electrically connected. Additionally, the method and apparatus are obviously applicable to other transforms such as the mentioned Hadamard transform. Accordingly, the foregoing description of one embodiment is not to be considered as limiting and the actual scope of the invention is to be indicated only by the appended claims.

What is claimed is:

1. The method of signal processing to transform information between the time domain and the frequency domain which comprises the steps of applying a time-varying electromagnetic signal to a piezoelectric medium to generate an acoustic wave along a first predetermined path, generating a series of short electromagnetic sampling pulses at predetermined time intervals, applying the sampling pulses to the piezoelectric medium to traverse the same first predetermined path in a fashion such that translation of the sampling pulses occurs relative to the time-varying signal and parametric coupling of individual sampling pulses and the signal wave occurs at predetermined spaced positions, extracting electromagnetic energy resultant from the parametric coupling of the sampling pulses and the signal wave at the predetermined spaced positions along the first predetermined path, generating acoustic pulses at a first set of unique positions in the piezoelectric medium with the extracted electromagnetic energy corresponding to the coupled sampling pulses and signal wave to follow a first group of predetermined paths, at least two pulses being generated to follow each of said first group of predetermined paths, extracting electromagnetic energy at spaced positions resultant from the summation of acoustic pulses traversing each of the first group of predetermined paths, generating acoustic pulses at a second set of unique positions in the piezoelectric medium in response to the summation of the pulses extracted from each of the first group of predetermined paths, to follow a second group of predetermined paths, at least two pulses being generated to follow each of said second group of predetermined paths, extracting energy at spaced positions resultant from the summation of the acoustic pulses traversing each of the second group of predetermined paths, generating acoustic pulses at a third set of unique positions in the piezoelectric medium in response to the summation of the pulses extracted from each of the second group of predetermined paths, to follow a third group of predetermined paths, at least two pulses being generated to follow each of said third group of predetermined paths, and extracting energy at spaced positions resultant from the summation of the acoustic pulses traversing each of the third group of predetermined paths.

2. The method of signal processing according to claim 1 wherein said sampling pulse generating step includes generation of a plurality of sampling pulses during one cycle of the time-varying electromagnetic signal.

3. The method of signal processing according to claim 1 wherein said time-varying electromagnetic signal and said sampling pulses are applied to the piezoelectric medium to traverse a common path but in opposite directions.

4. The method of signal processing according to claim 1 the group of predetermined paths of the generated acoustic pulses are parallel and are non-intersecting with other paths of acoustic waves.

5. Signal processing apparatus to provide a discrete Fourier transform which comprises, a radio frequency pulse generator for producing a series of short, regular, identical pulses, a piezoelectric medium, transducer means for applying the short pulses to said medium to generate acoustic pulses along a predetermined path, means for applying a signal to be analyzed to said piezoelectric medium to generate an acoustic wave along the same path in the opposite direction, a series of sampling transducers spaced along the common propagation path to extract energy resultant from coupling of the pulses and the signal wave, a set of unique generating transducer pairs connected to said sampling transducers to be excited thereby and to generate acoustic pulses along predetermined paths, a first set of sum transducers for receiving acoustic energy from unique pairs of said transducer pairs, a second set of pulse generating transducer pairs connected to said first set of sum transducers to generate a second set of acoustic pulses, a second set of sum transducers for receiving acoustic energy from unique pairs of said second pulse generating transducers, a third set of pulse generating transducer pairs connected to said second set of sum transducers to generate a third set of acoustic pulses, and a third set of sum transducers for receiving acoustic energy from said third set of pulse generating transducer pairs.

* * * * *